Patented Aug. 8, 1950

2,518,228

UNITED STATES PATENT OFFICE 2,518,228

AMIDES OF DICARBOXYLIC ACID DERIVATIVES OF 2-SULFONILAMIDOTHIAZOLE

Herman Eldridge Faith, New Palestine, Ind., assignor to Allied Laboratories, Inc., Kansas City, Mo., a corporation of Delaware No Drawing. Application March 20, 1948,
Serial No. 16,138

3 Claims. (Cl. 260—239.95)

The present invention relates to a new class of compounds comprising the amides of dicarboxylic acid derivatives of 2-sulfanilamidothiazole. More particularly, it relates to amides of 2($N^4$-succinylsulfanilamido)-thiazole and 2-($N^4$-phthalylfanilamido)-thiazole.

The broad class of compounds may be represented by the following general formula:

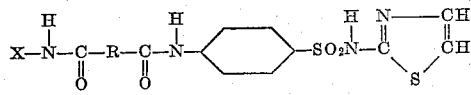

wherein X represents H, alkyl or aryl groups and R represents an alkyl or aryl group.

The preferred class of compounds are those represented by the above formulae wherein X represents H, alkyl or aryl groups and R is —$CH_2CH_2$— or

My new compounds may be useful in the treatment of bacterial diseases especially those of the intestinal tract. They are also useful as intermediates for the preparation of pharmaceuticals and dyestuffs.

The invention will be described in greater detail in conjunction with the following specific examples which, however, are merely illustrative of the preferred method and are not intended to limit the scope of the invention. The parts are by weight except in the case of liquids which are expressed in corresponding parts by volume.

*Example I.—Preparation of the amide of 2-($N^4$-succinylsulfanilamido)-thiazole:2-($N^4$-succinamylsulfanilamido)-thiazole*

64 parts of dry 2-($N^4$-succinylsulfanilamido)-thiazole is stirred into 180 parts of thionyl chloride. Hydrogen chloride and sulfur dioxide gases evolve vigorously for 10 to 15 minutes. During this time complete solution occurs, followed by a precipitation of a solid product. The mixture is allowed to stand at room temperature for 20 minutes, after the evolution of gas. Then the remaining thionyl chloride is distilled off by vacuum. The solid residue is added in portions to 180 parts of cold concentrated ammonium hydroxide. The solution is kept cold for 25 to 30 minutes, stirred with charcoal and filtered. The filtrate is subjected to reduced pressure to remove much of the excess ammonia. Then with cooling the solution is neutralized to pH 7.5 with 20% hydrochloric acid. 2-($N^4$-succinamylsulfanilamido)-thiazole is obtained. It is purified by dissolving in cold dilute ammonium hydroxide, stirring with activated charcoal and precipitating by neutralizing to pH 7.5 with hydrochloric acid. The compound forms a hydrate.

*Example II.—Preparation of the anilide of 2-($N^4$-succinylsulfanilamido)-thiazole; p-(2-thiazoylsulfamyl)-succinanilide*

1.43 parts of dry 2-($N^4$-succinylsulfanilamido)-thiazole is reacted with 6 parts of thionyl chloride as in Example I. This gives 1.3 parts of chlorinated product after the thionyl chloride is distilled off. This product is heated at 50° to 55° C. for 30 minutes with 6 parts of aniline. The reaction mixture is then cooled and stirred into dilute hydrochloric acid. The insoluble fraction is filtered off and crystallized from 50% ethanol to purify. The product is p-(2-thiazoylsulfamyl)-succinanilide.

By substituting 2-($N^4$-phthalylsulfanilamido)-thiazole for the succinyl compound in the examples, the compounds 2-($N^4$-phthalamylsulfanilamido)-thiazole and p-(2-thiazoylsulfamyl)-phthalanilide are readily obtained.

Similarly by substituting other aryl amines, and alkyl amines for the aniline and ammonia, the corresponding amines are obtained.

Among the primary amines that can be used are ethylamine, methylamine, propylamine, octylamine, dodecylamine, 2-aminonaphthalene, orthoaminotoluene, meta aminotoluene and para aminotoluene.

What I claim is:

1. A compound selected from the group consisting of 2-($N^4$-succinamylsulfanilamido)-thiazole and 2-($N^4$-phthalamylsulfanilamido)-thiazole.

2. The compound 2-($N^4$-succinamylsulfanilamido)-thiazole.

3. The compound 2-($N^4$-phthalamylsulfanilamido)-thiazole.

HERMAN ELDRIDGE FAITH.

REFERENCES CITED

The following references are of record in the file of this patent:

UNITED STATES PATENTS

| Number | Name | Date |
|---|---|---|
| 2,324,013 | Moore et al. | July 13, 1943 |

OTHER REFERENCES

Sidgwick, "The Organic Chemistry of Nitrogen" (Oxford Press, New York, New York, 1937), pp. 136–139.

Moore et al., J. Amer. Chem. Soc., vol. 64, pp. 1572–1575 (1942).

Fieser et al., "Organic Chemistry" (D. C. Heath & Co., Boston, 1944), page 185.